United States Patent [19]

Hitzky

[11] Patent Number: 5,361,816
[45] Date of Patent: Nov. 8, 1994

[54] TREAD FOR PNEUMATIC TIRE AND TIRE COMPRISING SUCH A TREAD

[75] Inventor: Leo J. Hitzky, Walderdange, Luxembourg

[73] Assignee: The Goodyear Tire & Rubber Company, Akron, Ohio

[21] Appl. No.: 114,019

[22] Filed: Aug. 30, 1993

[51] Int. Cl.$^5$ ............................................. B60C 11/11
[52] U.S. Cl. ............................................. 152/209 R
[58] Field of Search ................ 152/209 R, 209 D; D12/146

[56] References Cited

U.S. PATENT DOCUMENTS

| D. 304,588 | 11/1989 | Fukumoto et al. | D12/146 |
| 4,884,606 | 12/1989 | Matsuda et al. | 152/209 R |
| 5,012,847 | 5/1991 | Fukumoto et al. | 152/209 R |
| 5,137,068 | 8/1992 | Loidl et al. | 152/209 R |

FOREIGN PATENT DOCUMENTS

| 0235072 | 9/1987 | European Pat. Off. | |
| 0047306 | 4/1981 | Japan . | |
| 0194605 | 11/1983 | Japan | 152/209 D |
| 0175205 | 7/1987 | Japan | 152/209 R |
| 0014904 | 1/1990 | Japan | 152/209 D |
| 0041908 | 2/1990 | Japan | 152/209 D |
| 4108004 | 4/1992 | Japan | 152/209 D |

*Primary Examiner*—Michael W. Ball
*Assistant Examiner*—Nancy T. Krawczyk
*Attorney, Agent, or Firm*—David E. Wheeler

[57] ABSTRACT

A pneumatic tire having a block design suited for off-road use modified to improve rolling resistance and noise properties when used on paved surfaces has a tread design having angled lateral groove between the blocks in each circumferential row of blocks in the tread. Narrow grooves separate the blocks in several of the rows of blocks, and tie bars are present in the lateral grooves separating blocks in other rows of blocks. Void areas in the shoulder area of the tire enhance traction in mud and sand.

16 Claims, 3 Drawing Sheets

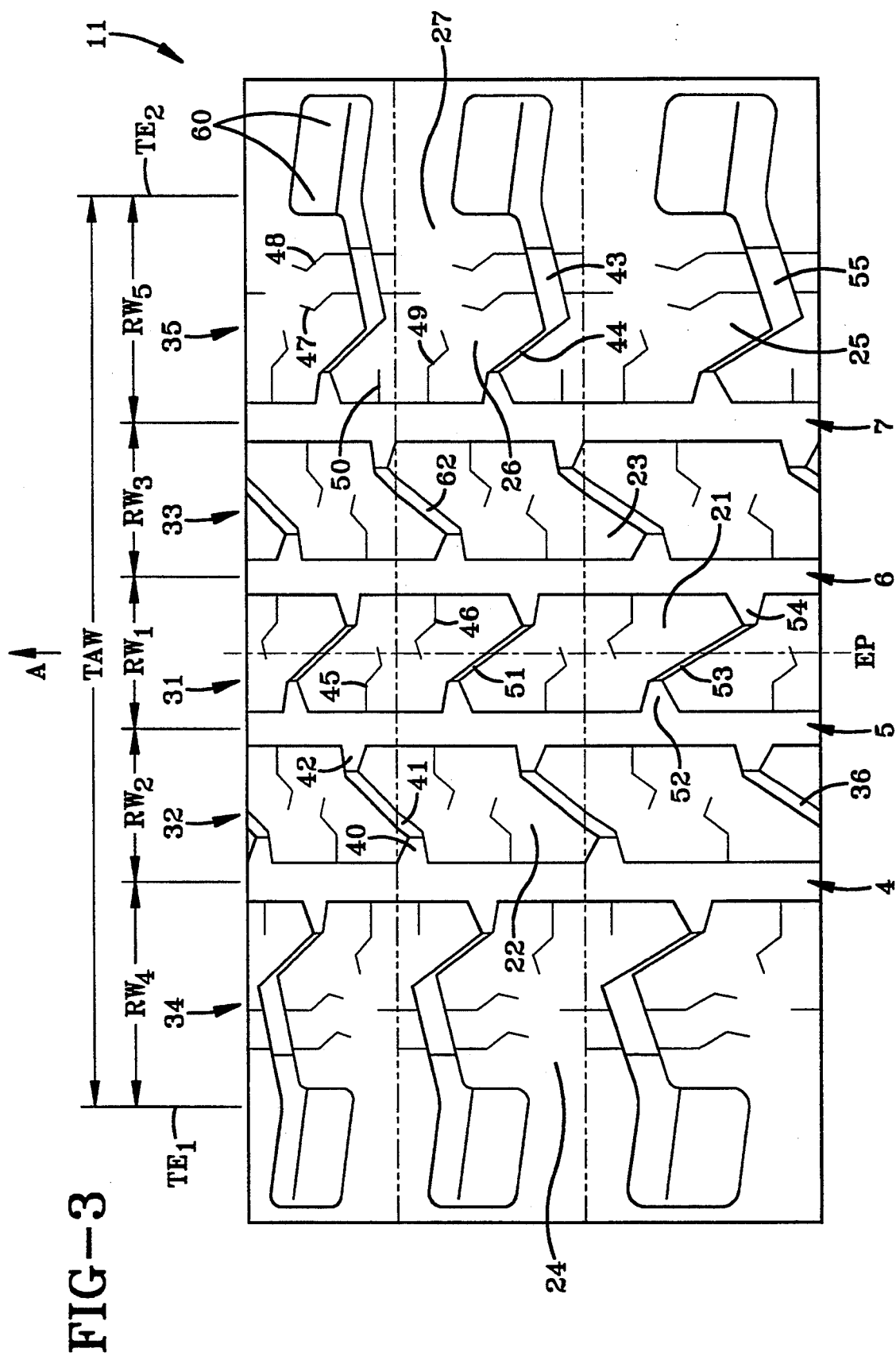

TREAD FOR PNEUMATIC TIRE AND TIRE COMPRISING SUCH A TREAD

BACKGROUND

The invention relates to pneumatic tire treads as well as to pneumatic radial tires comprising such a tread, such tires being suited for use on or off-road.

Off-road tires tend to have an aggressive, all block tread pattern, which provides good traction by digging into the ground. When used on paved surfaces, however, the tires cause a rough ride and tend to be very noisy. Partly because of the roughness of the ride, such tires have a high rolling resistance on paved surfaces.

It is known in the art that ribbed tires, i.e. tires having continuous "ribs" of tread rubber annularly around the tread, provide a smooth quiet ride on paved surfaces. Such tires provide poor performance when used off-road since there are no aggressive blocks for digging into the ground.

It is an object of this invention to provide a tire that provides good off-road traction, while providing a quiet, smooth ride on paved surfaces, as compared to conventional off-road tires.

It is a further object to provide a tire tread having an improved rolling resistance, as compared to conventional tires used off-road.

SUMMARY OF THE INVENTION

The tire of the invention comprises at least a pair of annular beads, at least one carcass ply wrapped around the beads, a ground contacting tread portion disposed over the carcass ply in a crown area of the tire and sidewalls disposed between the tread and the beads. The ground contacting portion of the tread has five rows of blocks annularly around the tire comprising two rows of shoulder blocks, a center row of blocks and two intermediate rows of blocks. The center row of blocks corresponds substantially with the equatorial plane (EP) of the tire and narrow grooves between blocks in the center row have a width of 1% to 5% of the length of a block. Similar narrow grooves separate an least a portion of the shoulder blocks.

In the illustrated embodiment of the invention, narrow lateral grooves in the shoulder rows of blocks and in the center row of blocks are angled in substantially the same direction with respect to the EP of the tire, and conventional lateral grooves, between the blocks in the intermediate rows, are angled substantially in the opposite direction. The narrow grooves have an angle of 30°/150° to 60°/120° with respect to the EP of the tire. The conventional grooves have an angle of −125°/−55° to −140°/−40° with respect to the EP of the tire.

Hook shaped sipes are located in all the blocks on the tire. Most of the hook shaped sipes are oriented substantially laterally in the tire. Some of such sipes in the shoulder blocks are oriented substantially parallel to the EP of the tire.

Tie bars are located in the grooves between the intermediate row of blocks, and such tie bars have a depth of 60% to 80% of the nominal tread depth (which is the depth of a circumferentially extending groove).

A tire tread, substantially as described with respect to the tire described above is also provided.

BRIEF DESCRIPTION OF THE DRAWINGS

FIG. 3 is an enlarged fragmentary view of a portion of the tread of the tire of FIG. 1.

DETAILED DESCRIPTION OF THE INVENTION

For the purpose of this invention, a pneumatic radial tire is a tire wherein the cords of the carcass reinforcement which extend from bead to bead are substantially parallel to one another and are laid at a cord angle between 75° and 90° with respect to the equatorial plane (EP) of the tire. As used herein, an equatorial plane means a plane perpendicular to a tire's axis of rotation and passing through the center of its tread, midway between the sidewalls of the tire. The terms "radial" and "radially" are understood to refer to directions that are perpendicular to the axis of rotation of a tire, the terms "axial" and "axially" are used herein to refer to lines or directions that are parallel to the axis of rotation of a tire and the terms "lateral" and "laterally" are understood to refer to directions going from one sidewall of a tire towards the other sidewall of a tire. "Groove" means an elongated void area in a tread that may extend circumferentially or laterally in the tread in a straight, curved or zig-zag manner. A conventional groove usually has a width which comprises about 15% to about 30% of the length of an adjacent block. A "sipe" is a groove having a width in the range from about 0.2% to 0.8% of the tread width. Sipes are typically formed by steel blades, having a width of 0.4 to 1.6 mm, inserted into a cast or machined mold; inasmuch as sipes are so narrow, they are illustrated by single lines. "Tread width" (TW) is defined as the greatest axial distance across a tread, when measured (using a footprint of a tire,) laterally from shoulder to shoulder edge on the cavity shape, when mounted on the design rim and subjected to a specified load and when inflated to a specified inflation pressure for said load. The tread arc width (TAW) describes the total curved tread extension from shoulder to shoulder edge. Obviously, as the tire tread is curved, TAW is always a few percent larger than TW. The footprint width is typically slightly smaller than TW, as the shoulder (which is usually round not sharp) is not fully in contact with the road. Axial widths and other widths of other tread features or components are measured under the same condition as the tread width. By "footprint" is meant the contact patch or area of contact of the tire tread with a flat surface under normal load, pressure and speed conditions.

It is to be understood that the present invention relates to new tires, retreaded tires, and tire treads in strip form being at least partly vulcanized and having a pattern of grooves and blocks integral therewith.

Figure 1:
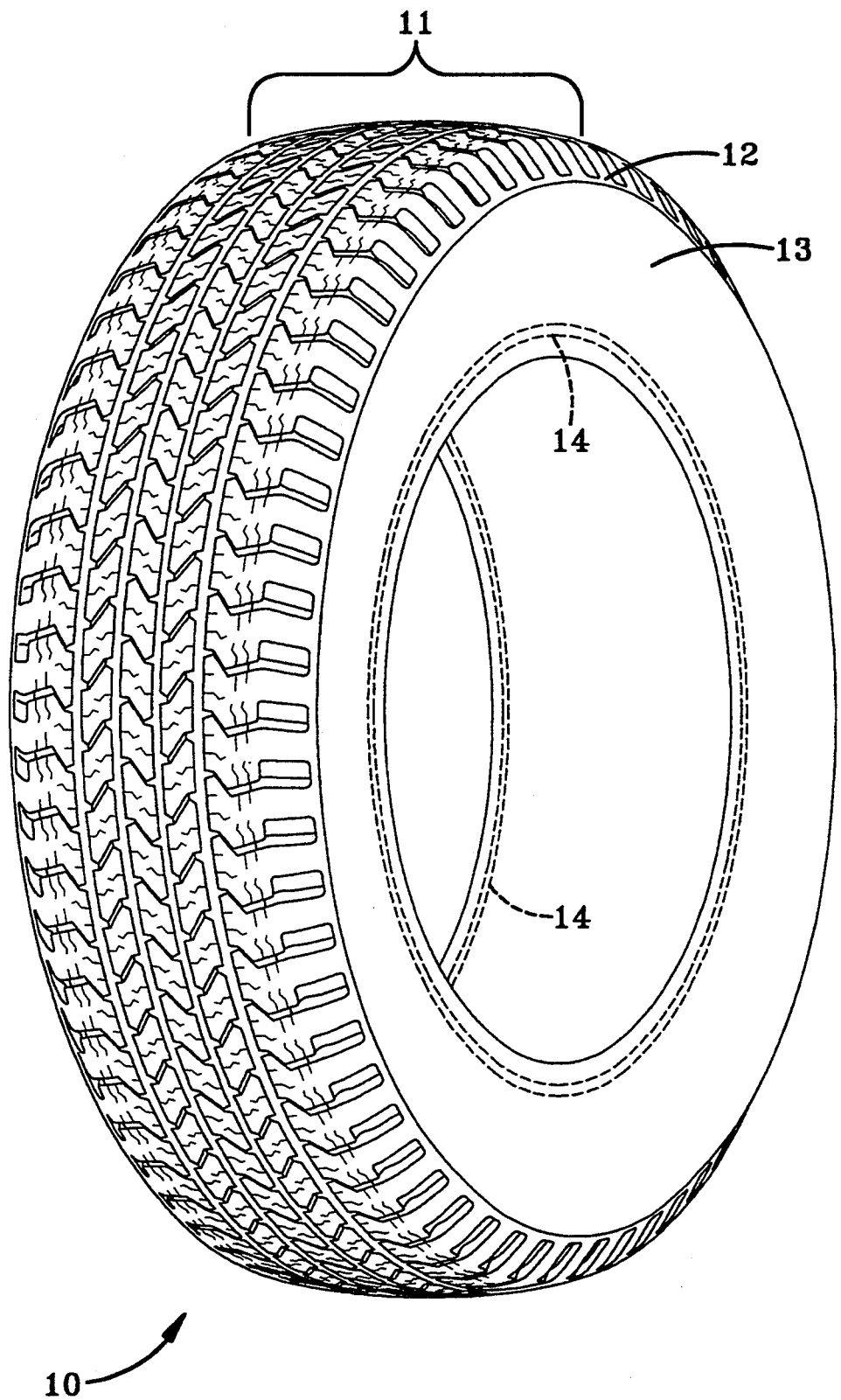
FIG. 1 is a front view of a tire embodying a tread made in accordance with the invention.
Figure 2:
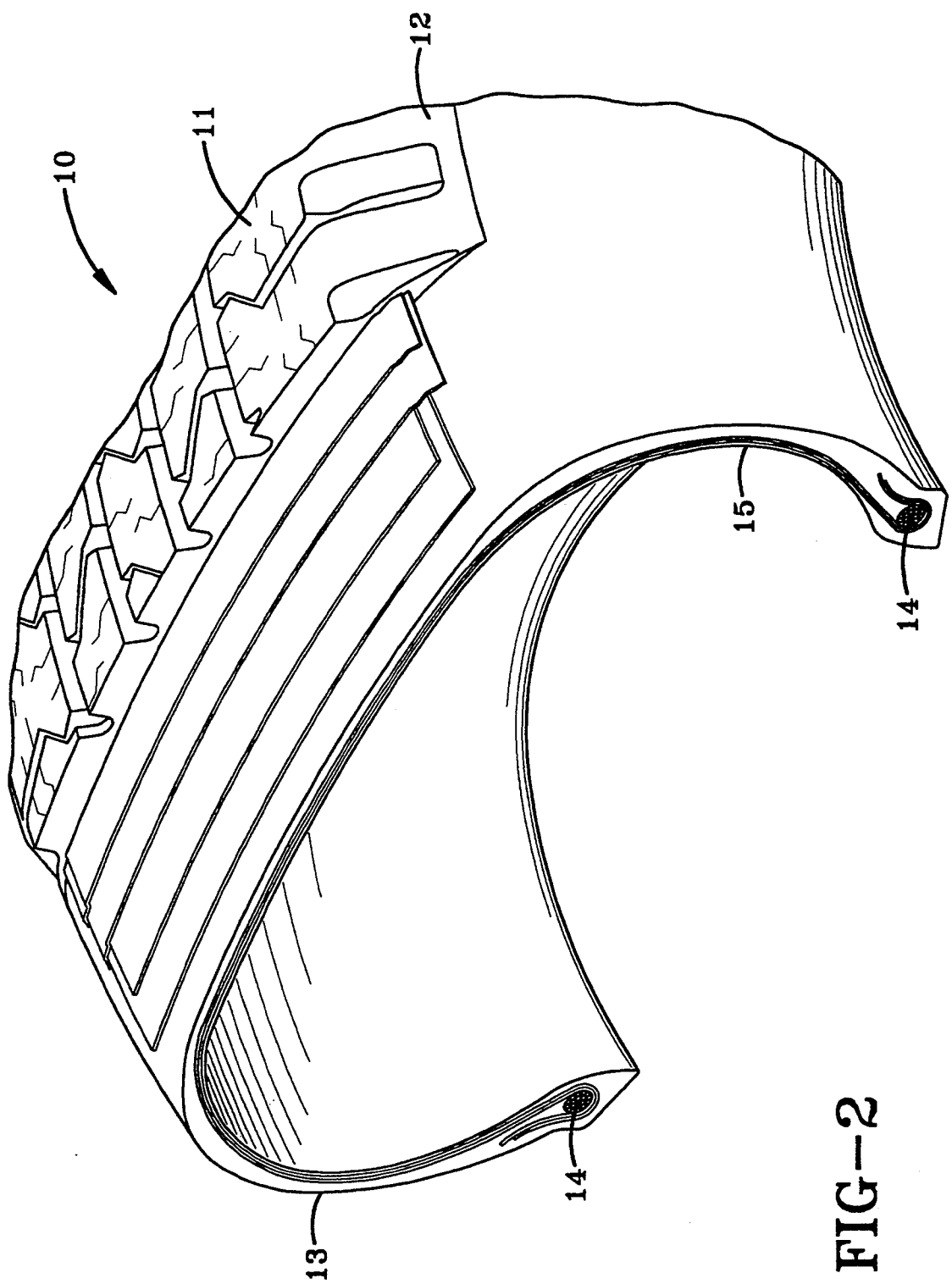
FIG. 2 is a perspective cross section view of the tire shown in FIG. 1.

With reference now to FIGS. 1 and 2, a pneumatic tire 10 having a ground contacting tread 11 is illustrated. The treads are adjacent to shoulders 12 which are in turn adjacent to sidewalls 13 that extend radially inwardly from the tread to the area of bead 14. Carcass plies 15 wrap around bead 14 and support the tread in a crown area of the tire.

Referring now to FIG. 3, there is represented an enlarged fragmentary view of the tread of the tire shown in FIG. 1. The tread 11 has four circumferentially extending straight grooves 4–7 therein, spaced apart axially across the surface of the tread and dividing the tread into five circumferentially extending rows 31–35 (hereafter respectively referred to as center row 31, intermediate rows 32, 33 and shoulder rows 34, 35) of elastomeric blocks 21–25. By circumferentially extending "straight groove" is meant that the groove edges are substantially parallel to one another and the centerlines of circumferentially extending grooves are substantially straight. The circumferentially extending grooves 4–7 have a width ranging between 3% and 6% and preferably a width of 4% and 5% of the tread arc width. It is understood that there are two circumferentially extending grooves on either side of the equatorial plane in the illustrated embodiment, but the number may vary in accordance with the size of the tire.

As measured in a tire footprint, the axial widths RW1–RW5 of the center blocks, each of the blocks of the intermediate row and the blocks of the shoulder rows, delimited by the axial position of the centerline of the bordering circumferentially extending straight grooves, are respectively from about 14% to 18%; 15% to 20%; and 22% to 28% of the tread width TW of the ground engaging portion of the tread.

The blocks 21–25 of elastomeric material in each of the rows 31–35 are disposed circumferentially about the tire in a repetitive manner and in a given row they have substantially the same geometric shape. The inclination of the walls which are not parallel to the equatorial plane and the widths of the grooves separating the blocks in each row depend on the pitch variation, as is practiced in the industry for tire noise reduction.

The generation of noise while running on pavement is a particular problem encountered in the use of tires designed for use off-road. The tread of the invention minimizes the noise (and it has been found, lowers the rolling resistance) of the tire by providing a narrow groove between a portion of the blocks in the shoulder row and between the blocks in the center row, and by angling the grooves at a substantial angle with respect to the EP. The small gap between the blocks, and their angle of orientation, causes the row of blocks to behave substantially like a rib when contacting pavement. That is, because of the angled grooves, the leading and trailing edge of the blocks are loaded into and exit the footprint incrementally, avoiding noise caused by the block edge, as a whole, striking the pavement. For similar reasons, the hum caused by distortion of a block, and its restoration to its original shape, is minimized.

Because the grooves separating the intermediate row of blocks are somewhat wider, the transition from one block to the next is not quite as smooth, but the wider grooves provide a more aggressive block element for traction. To buttress the blocks in the intermediate rows, tie bars 62 are provided in the grooves to reduce hum and to provide support to the blocks when they dig into the ground.

A further reduction of noise is obtained by skewing the blocks so that no two blocks enter the footprint at the same time. As can be seen from FIG. 3, none of the blocks across the tire are axially aligned.

Specifically, the block elements 22, 23 of the intermediate rows are, in a front view of the tire, delimited laterally by the circumferentially extending grooves 4–7 and from the neighboring block elements in the same row by laterally extending zig-zag grooves having three branches 40, 41, 42. The first branch 40 and the third branch 42, opening into the circumferentially extending grooves 5 and 6 on either side of the block row, have a varying width. The widths of the first and third branches increase from the width equal to the width of a second branch of the groove, up to a width of 4–9 mm when they intercept a circumferentially extending groove.

The inclination of the centerlines of the first and third branches is between 80° and 90° with respect to the equatorial plane. The inclination of the centerlines of the second branch is between 35°/145° and 55°/125° with respect to the equatorial plane in the intermediate rows, and between −35°/−145° and −55°/−125° in the center row.

As recognized by those skilled in the art, the angles formed by the intersection of two lines add up to 180°, but are complementary. As used herein, and looking in the direction of arrow A in FIG. 3, lines that are in the second and fourth geometric quadrants, when intersected by a line parallel to the EP of the tire, will be designated as positive and the angle and its complement will be provided (e.g. 125°/55°). Lines that are in the first and third quadrants will be designated as negative, and will also be provided in terms of the angle and its complement (e.g. −55°/−125°).

The second branch 41, connecting the first branch 40 and third branch 42, have a substantially constant width over their length and have a negative angle.

The lateral grooves 51 separating the blocks 21 in a center row 31, have substantially the same shape having branches 52, 53, 54 as described above with respect to the lateral grooves between blocks 22, 23 in intermediate rows 32, 33, except that the angle of the second branch 53 is positive. In second branch 53, the groove is "narrow" and is about 1–2 mm wide.

It is understood that all groove widths are measured perpendicular to the centerline of the groove.

In the illustrated embodiment, there are three rows of blocks having a second branch with positive angles of orientation (see the discussion of the shoulder blocks below), and two rows of blocks with a second branch having negative angles of orientation, and the blocks with negative angles are wider than the blocks with a positive angle of orientation, the tread pattern is in balance and does not cause a pull to one side or the other of the direction of travel.

The narrow grooves 53, 44 in the center row and the shoulder rows have an angle of 30°−60°/150°−120°, preferably 35°−55°/145°−125° with respect to the EP of the tire. The wider grooves 41 in the intermediate rows have an angle of 40°-55°/140°−125°, preferably 45°-50°/145°-130° with respect to the EP of the tire. The tie bars in the intermediate rows have a depth of 60% to 80% of the nominal tread depth.

As used herein, "narrow" grooves have a width of 1% to 5%, preferably 2% to 4% of the length of an adjacent block element as measured at its centerline length parallel to the EP of the tire. In contrast, more conventional lateral grooves, such as those in the intermediate rows of blocks, have a width of 8% to 25%, preferably 12% to 20% of the length of its adjacent block element.

In the illustrated embodiment, the narrow grooves are made using 1 mm thick blades.

In the intermediate and center rows, the depth of the first and third branches is substantially equal to the nominal tread depth. In the intermediate rows, the depth of the second branch of the lateral groove is between 60% and 80% and in the center row, between 40% and 60% of the nominal tread depth.

The ratio of the length of a second branch to the length of a first or third branch is between 1 and 4, a ratio of 3 being preferred.

In a preferred embodiment, the block elements 24, 25 of the shoulder rows 34, 35 each comprise two portions, an axially innermost main portion 26 and an axially outermost shoulder portion 27. The main portion 26 has substantially the same geometric shape as the block elements 21 of the center row 31, with the difference that third branches 43 nearest to the shoulder of the laterally extending grooves spacing the blocks 24, 25 have a substantially constant width of between 3 and 8 mm and form with the second branch 44 an angle between 110° and 150°. The width of the second branch 44 is about 1 mm and the inclination is opposed to the inclination of the second branch in the neighboring row 32, 33. The remaining side of an the outermost shoulder portion 27 is delimited by the respective tread edge, $TE_1$ or $TE_2$. In a preferred embodiment, for appearance reasons and also to provide extra traction when the tire is operated in mud or sand, the branch 43 nearest to the shoulder opens into a wide void area 60, at tread edge $TE_1$ or $TE_2$, that continues into the shoulder. The second branch 44 and the neighboring portion of the branch 43 nearest to the shoulder have respectively depths of 40% to 60% and 60% to 80% of the nominal tread depth. It is to be understood that providing the shoulder blocks 24, 25 with an extra shoulder portion 27 confers a high lateral stiffness to the tire tread, thereby improving handling.

In a preferred embodiment of the invention, the blocks of the center and intermediate rows 31-33 include hook shaped sipes 45, 46 originating in a circumferentially extending groove 4-7, about halfway between two laterally extending grooves. The sipes extend substantially perpendicular to the equatorial plane EP. Generally a sipe can have a depth equal to or less than the nominal depth of the tread; in the illustrated embodiment, the sipes have a first portion nearest to the circumferentially extending groove having a depth of 15% to 30% of the nominal tread depth, and second portion towards the center of the block with a depth of 70% to 90% of the nominal tread depth.

The shoulder portions 27 of the shoulder block elements 24, 25 comprise at least one, preferably two, hook shaped sipes 47, 48 oriented substantially parallel to the equatorial plane EP, originating in groove 43, nearest to the shoulder. In a preferred embodiment, the sipes 47, 48 have a first portion nearest to the groove 43, with a depth of 15% to 30% of the nominal tread depth, and second portion having a depth of 40% to 90% of the nominal tread depth, towards the center of the blocks 24, 25. The main portion 26 of shoulder blocks 24, 25 include one or two straight or hook shaped sipes 49 having an orientation and depths comparable to those of the sipes 45, 46 included in the intermediate rows 31-33 of blocks 21-23, and shorter sipes 50.

The circumferentially oriented sipes in the shoulder blocks (the area of highest ground pressure in the tires of the invention) are believed to contribute to a quiet ride.

The invention is further illustrated with reference to the following example.

EXAMPLE

A steel belted radial carcass tire of size 255/65 R 16 was made with a tread width of about 200 mm and five rows of blocks. The rows of blocks were molded to have axial widths RW1 and RW2 of about 36 and 29 mm respectively. The pitch ratios were set at 17, 21 and 26 (mm) and the tread included 70 circumferentially spaced pitches.

The nominal tread depth is about 9 mm, and the widths of the grooves depend on their axial position in the tread and the pitch variation. The circumferentially extending grooves have a width of about 8 mm.

Two carcass plies comprising 1100/2 dTex polyester reinforcement cords and an uncured cord density of 29 ends per inch (EPI) were used in the construction. The belt structure comprised two single cut plies reinforced by $2+2 \times 0.25$ mm steel cords, having a cord density of about 22 EPI, forming angles of about 20° with the equatorial plane, the angles of the cables in different plies extending in opposite directions. The tire included 2 turns of an overlay ply reinforced with 940/2 dTex Nylon having a cord density of 30 EPI, and a substantially zero degree inclination with respect to the equatorial plane.

The tread has a net to gross ranging between 65% and 75% and comprises an elastomeric compound having a modulus ranging between 4 and 12 MPa, a Shore A hardness ranging between 55 and 70, an elongation superior to 400% and a tensile strength superior to 14 MPa.

While certain representative embodiments have been described for the purpose of illustrating the invention, it will be apparent to those skilled in the art that various changes and modifications my be made therein without departing from the spirit or scope of the invention. The invention has for instance been described with a design showing five rows of blocks; it can be envisioned for smaller tire sizes, to choose a three row design, suppressing thereby the two intermediate rows of blocks, or for larger tire sizes to choose a seven row design, adding two intermediate rows of blocks. The features in common in each of these designs is that the angles of inclination of the lateral grooves (with respect to the equatorial plane) in neighboring rows of blocks are opposed, and that the widths of the grooves in the center and shoulder rows of blocks are narrow, less than 2 mm, and preferably about 1 mm in the illustrated embodiments.

What is claimed is:

1. A pneumatic tire having at least a pair of annular beads, at least one carcass ply wrapped around said beads, a ground contacting tread portion disposed over said carcass plies in a crown area of said tire and sidewalls disposed between said tread and said beads, wherein said ground contacting tread portion comprises five rows of blocks comprising two rows of shoulder blocks, a center row of blocks and two intermediate rows of blocks wherein said center row of said blocks corresponds substantially with the equatorial plane (EP) of the tire and wherein narrow grooves between blocks in said center row have a width of 1% to 5% of the length of said block, wherein narrow grooves separate at least a portion of said blocks in said shoulder rows of blocks, and wherein grooves between blocks in said intermediate row of blocks have a width of 8% to 25% of the block length and contain tie bars.

2. The pneumatic tire of claim 1 wherein all narrow grooves are angled in substantially the same direction with respect to the equatorial plane (EP) of the tire, and grooves having a width of 8% to 25% of the block length are angled in substantially the opposite direction.

3. The pneumatic tire of claim 1 wherein grooves between blocks in said center row cross the equatorial plane (EP) of the tire and have an angle of 30°/150° to 60°/120° with respect to said EP.

4. The pneumatic tire of claim 1 wherein narrow grooves between shoulder blocks have an angle of 30°/150° to 60°/120° with respect to said equatorial plane (EP).

5. The pneumatic tire of claim 1 wherein grooves between blocks in said intermediate rows of blocks have a width of 8% to 25% of the block length and comprise an angle of 125°/55° to 140°/40° with respect to the equatorial plane (EP) of the tire.

6. The tire of claim 1 wherein hook-shaped sipes are located in all said blocks.

7. The tire of claim 6 wherein hook-shaped sipes in said shoulder blocks are oriented substantially parallel to said equatorial plane (EP).

8. The pneumatic tire of claim 1 wherein said tie bars have a depth of 60% to 80% of the tread depth.

9. The pneumatic tire of claim 1 wherein said tie bars have a depth of 60% to 80% of the tread depth.

10. A tire tread having five (5) rows of blocks comprising two (2) rows of shoulder blocks, a center row of blocks and two (2) intermediate rows of blocks wherein said center row of said blocks corresponds substantially with the center line of the tread and wherein narrow grooves between blocks in said center row have a width of 1% to 5% of the length of said block, and wherein narrow grooves separate at least a portion of said blocks in said shoulder rows of blocks and wherein grooves between blocks in said intermediate row of blocks have a width of 8% to 25% of the block length and contain tie bars.

11. A tire tread of claim 10 wherein all narrow grooves are angled in substantially the same direction with respect to the center of the tread, and grooves having a width of 8% to 25% of the block length are angled in substantially the opposite direction.

12. A tire tread of claim 10 wherein grooves between blocks in said center row cross the center line of the tread and have an angle of 30°/150° to 60°/120° with respect to said center line.

13. A tire tread of claim 10 wherein narrow grooves between shoulder blocks have an angle of 30°/150° to 60°/120° with respect to said center line.

14. A tire tread of claim 10 wherein grooves between blocks in said intermediate rows of blocks have a width of 8% to 25% of the block length and comprise an angle of $-(125°/55°)$ to $-(140°/40°)$ with respect to the center line of the tread.

15. A tire tread of claim 10 wherein hook-shaped sipes are located in all said blocks.

16. A tire tread of claim 1 wherein hook-shaped sipes in said shoulder blocks are oriented substantially parallel to said center line.

* * * * *